Patented Sept. 19, 1950

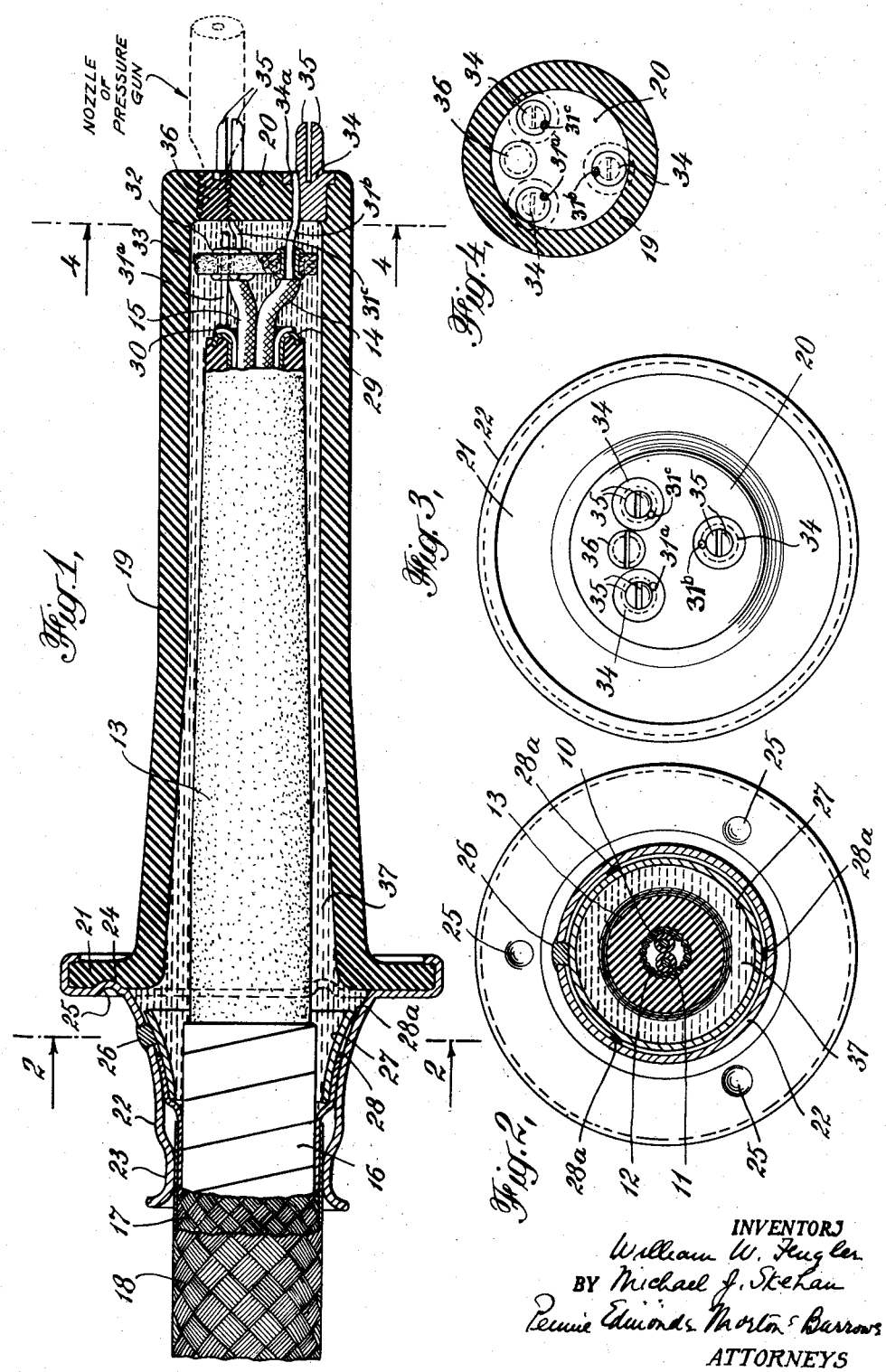

2,522,572

UNITED STATES PATENT OFFICE 2,522,572

CABLE TERMINAL

William W. Fengler, Glenbrook, and Michael J. Skehan, West Norwalk, Conn., assignors to Machlett Laboratories Incorporated, Springdale, Conn., a corporation of Connecticut Application January 30, 1947, Serial No. 725,202

3 Claims. (Cl. 174—20)

This invention relates to terminals for cables used for supplying electrical energy to high tension apparatus, such as X-ray equipment, and is concerned more particularly with a novel terminal of the type used for making readily detachable connections. The new terminals are superior to prior similar terminals, in that they can be constructed more easily and are more reliable in operation. The invention comprehends both the new terminal and a method by which it can advantageously be produced.

A prior terminal resembling that of the present invention is disclosed in Rogers Patent 2,273,538, issued February 17, 1942, and it includes a sleeve of rigid insulating material enclosing the end of the cable and having a closed end carrying terminal prongs connected to the conductors in the cable. The opposite end of the sleeve is closed by a metallic flare mounted on the cable and having a rim spun over a flange on the sleeve. The space within the flare and sleeve around the cable is filled with a hardened insulating compound which serves to hold the sleeve firmly in place and also to fill the air space that would otherwise be present inside the assembly. In making the terminal, the insulating sleeve is partly filled with the insulating compound in molten condition, after which the prepared end of the cable is inserted into the sleeve. During the movement of the end of the cable into the sleeve, the compound is forced upwardly into the space between the cable and sleeve. As the compound has a high melting point, for example, 150° C., it is difficult to handle and also it is hard to insure that the space between the cable and sleeve will be completely filled with the compound and devoid of air pockets, which might result in break-down in use.

The present invention is, accordingly, directed to the provision of a novel terminal for high tension cables, which is easier to make than prior similar terminals, and of a method, by which the terminal may be readily constructed. The new terminal includes a sleeve of rigid insulating material loosely enclosing the end of the cable, and a metallic flare, which is secured to the cable against movement. The flare closes the inner end of the sleeve and is attached to the sleeve to hold the latter against movement. The space within the sleeve and flare, which is otherwise unoccupied, is filled with a permanently viscous insulating material, such as a jelly-like organosilicon compound. The closed end of the sleeve at the end of the cable is provided with an opening closable by a plug and the flare initially has an opening through its wall.

In the manufacture of the terminal in accordance with the new method, the parts are assembled with the end of the cable in the sleeve and the flare fast on the cable and secured to the sleeve. The insulating material is then forced under pressure through the opening in the closed end of the sleeve and forces air ahead of it through the opening in the flare wall, as the filling operation continues. When the insulating material begins to issue from the opening in the flare, the filling operation is discontinued, the openings in the sleeve and flare are closed, and the terminal is ready for use.

For a better understanding of the invention, reference may be made to the accompanying drawing, in which Fig. 1 is a longitudinal sectional view through the new terminal;

Fig. 2 is a sectional view on the line 2—2 of Fig. 1;

Fig. 3 is an end view of the terminal; and

Fig. 4 is a sectional view on the line 4—4 of Fig. 1.

The form of the new terminal illustrated in the drawing is shown applied to a cable, which includes three conductors 10, 11 and 12, encased within a layer of rubber compound 13. Conductors 10 and 11 are provided with individual insulating coatings 14, 15 and lie within conductor 12, which is the common return and is made up of a circular series of bare wires. The rubber layer enclosing the conductors is wound with tape 16 and the cable is provided with grounding means taking the form of a sheath 17 of copper braid, which overlies the tape and is enclosed within an insulating sheath 18, which may be a rayon braid.

The terminal includes a sleeve 19 of rigid insulating material, such as a phenolic condensation product, and the sleeve has a closed end 20 and an open end surrounded by a circumferential flange 21. As a preliminary to mounting the terminal on the end of the cable, the tape is stripped from the outer surface of the rubber layer for the proper distance, the grounding sheath 17 is cut off just short of the end of the layer of tape and the rayon layer is then cut off short of the end of the grounding sheath. The exposed rubber layer is then tapered slightly and a portion at the end is removed to expose short lengths of the conductors.

The open end of the insulator 19 is closed by a metallic flare 22, the small end of which is forced into tight contact with the outer surface of the cable, as by crimping at 23. The large end of the flare extends outwardly and is turned around the outer edge of flange 21, for example, by a spinning operation. In order that the flare and insulator may be held against relative rotation, the edge of the flange 21 may be non-circular, or, as shown, one surface of flange 21 may be formed with a plurality of recesses 24 receiving depressed portions 25 of the flare. The flare is provided with an opening through the wall thereof which is initially open but, in the finished terminal, is closed by suitable means, such as a drop of solder 26.

In order to connect the flare 22 tightly to the cable and insure that it will be grounded, an inner metallic flare 27 is mounted on the cable with its small end inserted within the exposed end of the grounding sheath 17 and the sheath is then secured to the inner flare by soldering, as at 28. In assembling the parts, the outer flare is first mounted on the cable and moved back from the end and the inner flare is then placed upon the cable and its small end inserted within the sheath and secured thereto. The outer flare is then moved to enclose the inner flare and, in this operation, the end of the sheath is clamped tightly between the opposed surfaces of the two flares. The flares may then be soldered together at a number of spots 28a.

In mounting the terminal on the cable, a metal eyelet 29 is pushed into the end of the rubber layer 13 outside the circular series of wires forming the conductor 12, until the rim of the eyelet is embedded in the rubber. The exposed lengths of the wires are then cut off close to the eyelet and bent down against the eyelet and soldered thereto, as indicated at 30. Bare copper wires 31a, 31b, and 31c are soldered to turned-over portions of the wires of conductor 12 and to the ends of conductors 10 and 11, respectively. These lengths of bare wire are next passed through and soldered to eyelets 32 in a disc of insulating material 33.

In order to mount the insulator 19 on the cables, the inner and outer flares, loose on the cable, are pushed back a convenient distance from the end of the cable and the end of the cable is then inserted into the insulator. Three terminal elements 34 having spaced prongs 35 are mounted to extend through the closed end of the insulator, and each element has a flange 34a lying flush with the outer end of the insulator. A passage is formed through the flange of each element and in the surface of the element to the rear of the flange. As the end of the cable enters the insulator, the ends of the wires 31 extending beyond the disc 33 are fished through the passages in the terminal elements, and are cut off close to the outer surface of the flanges on the elements and soldered in place. At this stage in the assembly, the end of the cable is in proper position within the insulator and the conductors are connected to the terminal elements at the end of the insulator, but there is an air space within the insulator and the flares around the cable. This space must be filled with insulating material and a fourth opening through the end of the insulator is provided, in order that the insulating material may be introduced through the opening into the insulator to fill the space.

The insulating material employed within the insulator 19 is a permanently viscous material, and, preferably, one which does not change in viscosity substantially with changes in temperature. A jelly-like organo-silicon compound is suitable for the purpose and is preferred. In order to introduce the compound, it is injected under pressure through the fourth opening through the closed end 20 of the insulator 19 and, for this purpose, the compound may be forced into the interior of the sleeve by means of a pressure gun, the nozzle of which is inserted into the opening. At the time that the compound is injected into the sleeve, the opening through the wall of flare 22 is open so that, as the compound enters the sleeve, it forces air out ahead of it through the opening in the flare. The injection of the compound is continued until it begins to issue from the opening in the flare. At this point, the injection is discontinued and the injection opening, which is internally threaded, is closed by means of a plug 36 screwed into the opening. The opening through the wall of the flare is then closed by a drop of solder 26.

In the new terminal, the body of insulating compound 37, which fills the otherwise unoccupied space within sleeve 19 and the flare 22 does not set and thus does not anchor the sleeve 19 against rotation relative to the cable. Such rotation, however, is prevented by providing the flange and the portion of the flare 22 in contact with the flange with the interengaging parts. Since the compound 37 can be introduced into the sleeve in cold condition, its use greatly simplifies the construction of the terminal. Also, by introducing the compound through the opening in the closed end of the sleeve 19, the compound forces out air ahead of it, as it fills the space within the sleeve and flare, and air pockets are thereby avoided.

The form of the new terminal described is for use with a cable containing three conductors, but it is to be understood that the terminal, with appropriate changes, may be used with cables containing a different number of conductors, such as one, two or more than three.

We claim:

1. A terminal for a cable including at least one insulated conductor and a metallic grounding sheath, which comprises a sleeve of rigid insulation loosely enclosing the end of the cable, the sleeve being closed at one end and having a circumferential flange at the other end, a terminal element mounted on the closed end of the sleeve to project beyond said end and connected to the conductor, an inner metallic flare mounted on the cable with its small end within the grounding sheath and electrically connected thereto, an outer metallic flare mounted fast on the cable to enclose the inner flare, the flares being electrically connected and the outer flare closing the open end of the sleeve, the edge of the large end of the outer flare enclosing and gripping the edge of the sleeve flange to hold the outer flare and sleeve against movement lengthwise of the cable, cooperating parts on the outer flare and sleeve holding the outer flare and sleeve against relative rotary movement, and a body of a permanently viscous insulating material filling the otherwise unoccupied space within the sleeve and the large end of the flare.

2. A terminal for a cable including at least one conductor enclosed in insulation which comprises a sleeve of rigid insulating material loosely enclosing the end of the cable, the sleeve being closed at one end and open at the other, the sleeve having a circumferential flange at its open end, a terminal element mounted in the closed end of the sleeve to project beyond said end and connected to the conductor, a flare mounted on the cable and anchored thereto, the flare closing the open end of the sleeve, the edge of the large end of the flare enclosing and gripping the edge of the sleeve flange to hold the flare and sleeve against movement lengthwise of the cable, cooperating parts on the flare and sleeve holding the flare and sleeve against relative rotary movement, an opening through the closed end of the sleeve, a removable plug closing the opening, a sealed opening through the wall of the flare to the interior of the large end thereof, and a body of permanently viscous insulating material filling the otherwise unoccupied space within the sleeve and the large end of the flare.

3. A method of making a terminal for a cable including at least one insulated conductor, which comprises stripping insulation from one end of the cable to expose a length of the conductor, providing a sleeve of insulating material having a closed end with a terminal element projecting through said end and an opening at one side of the element, providing a metallic flare with an opening through its wall and mounting the flare on the cable with its large end facing the end of the cable, mounting the sleeve to enclose the end of the cable and connecting the conductor to the terminal element, securing the flare to the cable and to the sleeve to hold the latter against movement relative to the cable and form an enclosure made up of the interior of the flare and of the sleeve, introducing an insulating material in viscous condition into the interior of the sleeve through the opening in the closed end of the sleeve, until the material issues through the opening in the wall of the flare, and closing said openings.

WILLIAM W. FENGLER.
MICHAEL J. SKEHAN.

REFERENCES CITED

The following references are of record in the file of this patent:

UNITED STATES PATENTS

| Number | Name | Date |
|---|---|---|
| 1,497,002 | Sanderson | June 10, 1924 |
| 2,051,945 | Herz | Aug. 25, 1936 |
| 2,273,538 | Rogers | Feb. 17, 1942 |
| 2,280,711 | Machlett et al. | Apr. 21, 1942 |
| 2,283,023 | Williams | May 12, 1942 |
| 2,377,689 | Hyde | June 5, 1945 |